June 12, 1956     J. W. WEDGE     2,749,836

TOAST WARMING ATTACHMENTS FOR ELECTRIC TOASTERS

Filed March 29, 1954

INVENTOR.

James W. Wedge

BY

Scott L. Norviel

United States Patent Office 2,749,836
Patented June 12, 1956

2,749,836

TOAST WARMING ATTACHMENTS FOR ELECTRIC TOASTERS

James W. Wedge, Phoenix, Ariz.

Application March 29, 1954, Serial No. 419,249

4 Claims. (Cl. 99—339)

This invention concerns toast warming attachments for electric toasters.

One of the objects of the invention is to provide a means for holding and warming toast slices which is attached to and made a part of an electric automatic toaster and which will not interfere with the operation of the toaster;

Another object of the invention is to provide a toast holding apparatus which is pivotally mounted on a conventional automatic electric toaster and will move from a position above the toasting compartments, whereby it receives heat therefrom, to a position away from said toasting compartments so that it does not interfere with the operation of the toaster in placing bread slices in said compartments or removing toast therefrom;

Another object is to provide a metal plate having substantial heat holding qualities and provided with a swinging bracket at one end which is attachable to the toaster body and which will enable the user to swing the plate from a position over the toasting compartments to a position away from said compartments; said plate gaining heat from the toasting compartments, when in the first position above mentioned, and enabling the user to place and remove toast from the said toasting compartments when in the second position, above mentioned.

I attain the foregoing objects by means of the devices, construction and combination of component parts as illustrated in the accompanying drawing in which—

Similar numerals refer to similar parts in the several views.

Figure 1:
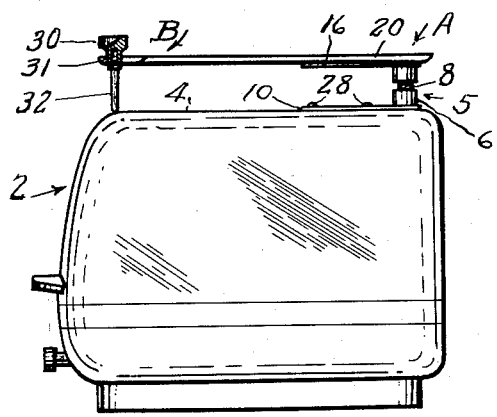
Figure 1 is a side elevation of a toaster provided with my improved toast holding plate, shown in warming position over the toasting compartments.
Figure 3:
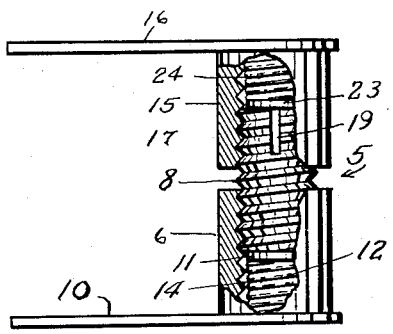
Figure 3 is a side elevation of the supporting bracket for the toast warming plate drawn on an enlarged scale and with parts sectioned off to show interior construction.
Figure 2:
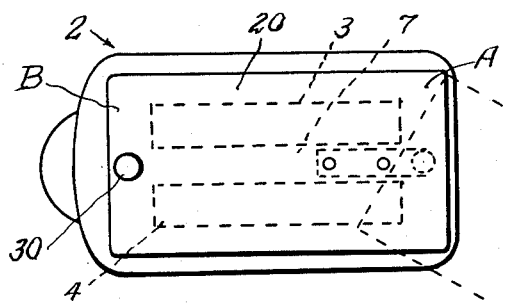
Figure 2 is a plan view thereof with the movement and moved position of the warming plate indicated by dotted lines.
Figure 4:
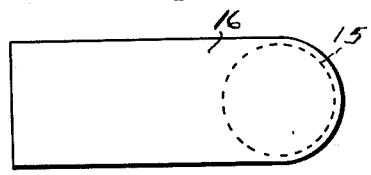
Figure 4 is a plan view thereof.
Figure 5:
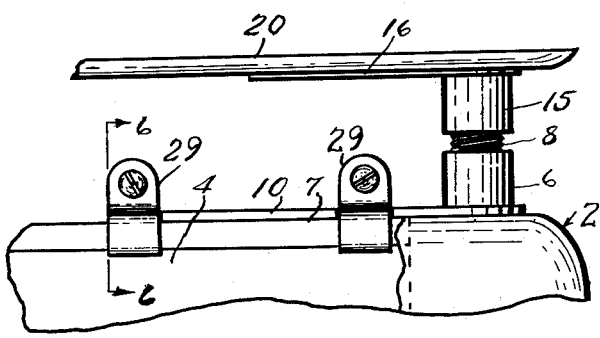
Figure 5 is a side elevation of a modified form of a portion of said bracket showing a modified means for attaching said bracket to the toaster body.
Figure 6:
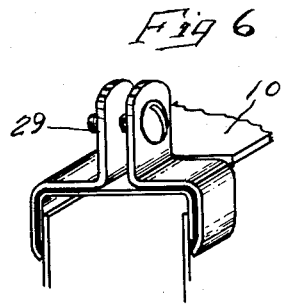
Figure 6 is a fragment of the case shown in section taken substantially on line 6—6 of Figure 5.

In the drawings numeral 2 indicates the toaster body. This is of conventional size and shape and is well known to the art. Within the body there are two toasting compartments wherein slices of bread are subject to heat from electrical coils until properly toasted, at which time automatic mechanism raises the toasted slices of bread.

Since this invention does not concern the toasting mechanism, it is not shown. Openings of the toasting compartments, however, are indicated by numerals 3 and 4.

On the top of the toaster there is a swinging pivotal bracket generally indicated by numeral 5. This bracket has a foot piece which consists of an attaching plate 10 which is held on to the central top part 7 of the toaster body 2 between the openings of the toasting compartments 3 and 4 by metal screws 28 driven into said body, or by clamps 29. At the outer end of this plate there is an upright pivotal mounting boss 6 which is preferably cylindrical and which is vertically and centrally bored and threaded. A pivot screw 8 is screwed into the threaded bore and its lower end abutted against a pressure washer 11 which presses down upon a spring 12 which is retained in the bottom of the bore 14.

On the upper end of this screw there is a similarly shaped cylindrical boss 15 which has a plate 16 attached to its upper end. This boss is vertically bored and threaded, as indicated by numeral 17, to receive the upper end of screw 8. Plate 16 on its upper end is attached to warming plate 20 by any convenient means such as screws or by brazing.

Between the inner end of bore 17 in boss 15 and the top of screw 8 there is a washer 23 which confines tension spring 24. It is also to be noted that the upper end of screw 8 is slotted and bifurcated, as indicated by numeral 19, to receive a screwdriver blade to enable the upper end of the screw to be enlarged somewhat by spreading its bifurcated upper portion. Normally spring 12, at the lower end of pivot screw 8, is tensioned greater than spring 24 within said boss 15 in its upper end, therefore, the turning motion which takes place when warming plate 20 is rotated, will be between the upper end of screw 8 and the threaded bore in boss 15. Adjustment of the height of plate 20 above the toaster case may be made by threading screw 8 into or out of boss 6.

It is to be noted that the upper boss 15 is attached by plate 16 to the middle of one end portion of plate 20 so that when the plate is swung over the toaster body it will be disposed above the toasting compartment openings 3 and 4. This is termed the inner or pivotal end of the plate and indicated by numeral "A." At its outer or free end "B" there is a knob 30 which is threaded onto a screw 31 which extends upward through the plate from the upper end of the leg 32. This leg extends downward from the underside of warming plate 20 and forms a support for the outer end "B" of the plate when it is in warming position as indicated in Figure 1.

Additionally, when in the warming position, the attachment cord of the toaster may be neatly wound around the pivotal bracket 5 and the supporting leg 32.

In use, the warming plate is swung to a position away from that over the toasting compartments as indicated by dotted lines and letter "C." In this position bread slices are inserted into the openings 3 and 4 of the toasting compartments and the automatic mechanism started. The warming plate 20 is then moved to a position over these compartments where it receives and absorbs heat from said compartments. When the toast is finished it pops up in the usual manner and then the warming plate 20 is again moved to position "C" so that it may be removed. Finished toast after removal from the toasting compartments, is buttered if desired, and again placed on plate 20 where it will remain warm by reason of the heat retained in the plate. Whenever additional heat is required to keep the toast warm the plate is again swung to a position over the warming compartments and it is further heated while the toasting mechanism is operated.

I claim:

1. A toast warming attachment for an electric toaster having a body enclosed by a case having a top with openings for the placement of bread slices and removal of toast over toasting compartments in said body, and a central top part between said openings, consisting of a pivotal bracket composed of a foot piece having an attaching plate secured to the central top part of said case, between said openings, a cylindrical, centrally bored and threaded, boss attached to the outer end of said attaching plate, a pivot screw threaded into said boss with its lower end bearing on a tensioning spring in the bottom of the bore in said boss, a horizontal toast warming plate having a centrally bored and threaded boss attached to its under face in the middle of one of its end portions threaded onto the upper end of said pivot screw, a tensioning spring in said boss bore operating between the end of said bore and the top end of said pivot screw; said bosses and pivot screw being disposed on said toaster case and warming plate so that said plate can be swung from a position over said toasting compartments of said toaster to a position to one side of said toaster case.

2. A toast warming attachment for an electric toaster having a body enclosed by a case having a top with parallel openings for the placement of bread slices to be toasted over toasting compartments in said body, and a central top part between said openings, consisting of a horizontal toast warming metal plate, a pivotal bracket attached to one end of said plate and mounted laterally on said case so that said plate may be positioned over the openings over said toasting compartments in said case and swung to one side of said toaster case away from said openings, said pivotal bracket consisting of an attaching plate clampably secured to said central top part of said case, a vertically bored and threaded boss disposed at the outer end of said plate adjacent a lateral edge of said case, a pivot screw screwed into said boss to provide vertical adjustment therefor, and frictionally detained in said boss by a tensioning spring in the bottom of said boss bearing on the bottom end of said pivot screw, a vertically bored and threaded boss attached to the under face of said toast warming plate near the center of one end portion thereof, threaded onto the top end of said pivot screw, and maintained in frictional engagement with said screw by a tensioning spring in the bore of said boss resiliently engaging the top of said pivot screw.

3. A toast warming attachment for an electric toaster having a body enclosed by a case having a top with parallel openings for the placement of bread slices to be toasted over toasting compartments in said body, and a central top part between said openings, consisting of a horizontal toast warming metal plate, having an inner pivotal end and an outer free end, an operating knob and a supporting leg attached to the free end of said plate, and a frictionally tensioned pivot attached to the inner pivotal end of said plate; said pivot consisting of an attaching plate secured to a side portion of said toaster case, a boss on said attaching plate, a vertically adjustable pivot screw, retained in said boss, having an expandable bifurcated top end portion and a boss having a vertically extending threaded bore secured to the bottom face of said warming plate at its inner pivotal end and screwed onto the upper end of said pivot screw and frictionally retained thereon by said expanded bifurcation of said screw.

4. A toast warming attachment for an electric toaster having a body enclosed by a case having a top with openings for the placement of bread slices and removal of toast over toasting compartments in said body, and a central top part between said openings, consisting of a pivotal bracket composed of a foot piece having an attaching plate secured to the central top part of said case, between said openings, a boss having a vertical bearing hole attached to the outer end portion of said attaching plate, a vertical pivot element having a lower end journal portion and an upper end journal portion with the lower end journal portion of said pivot element journalled in said boss, and means for maintaining predetermined frictional engagement between the said lower end journal portion of said pivot element and said boss bearing, a horizontal toast warming plate having a boss attached to its under face in the middle of one of its end portions, provided with means for frictionally restrained rotative attachment to the said upper end bearing portion of said pivot element; said bosses and pivot element being disposed on said toaster case and warming plate so that said plate can be swung from a position over said toasting compartments of said toaster to a portion to one side of said toaster case.

References Cited in the file of this patent

UNITED STATES PATENTS

| | | |
|---|---|---|
| 2,173,024 | Park | Sept. 12, 1939 |
| 2,482,068 | Larson | Sept. 13, 1949 |
| 2,493,222 | Braucht | Jan. 3, 1950 |
| 2,556,520 | Bunce | June 12, 1951 |
| 2,640,600 | Farr | June 2, 1953 |